(12) United States Patent
Vecchiarelli et al.

(10) Patent No.: US 7,344,573 B2
(45) Date of Patent: Mar. 18, 2008

(54) IMPREGNATION OF GRINDING WHEELS USING SUPERCRITICAL FLUIDS

(75) Inventors: Jodi Ann Vecchiarelli, Feeding Hills, MA (US); Thomas G. Kinisky, Chagrin Falls, OH (US); David A. Sheldon, Millbury, MA (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 199 days.

(21) Appl. No.: 10/702,917

(22) Filed: Nov. 6, 2003

(65) Prior Publication Data
US 2005/0101237 A1    May 12, 2005

(51) Int. Cl.
*B24D 11/00*  (2006.01)

(52) U.S. Cl. .............................. 51/295; 51/298; 51/307; 451/541; 451/548

(58) Field of Classification Search .................. 51/296, 51/298, 293, 307, 308, 309; 451/526, 541, 451/548
See application file for complete search history.

(56) References Cited

U.S. PATENT DOCUMENTS

| | | | |
|---|---|---|---|
| 2,806,772 A | | 9/1957 | Robie |
| 3,723,112 A | * | 3/1973 | Luebbe, Jr. ................... 430/40 |
| 4,552,786 A | * | 11/1985 | Berneburg et al. ...... 427/249.15 |
| 4,588,420 A | * | 5/1986 | Charvat ........................ 51/298 |
| 5,094,672 A | | 3/1992 | Giles, Jr. et al. |
| 5,221,294 A | | 6/1993 | Carman et al. |
| 5,429,648 A | | 7/1995 | Wu |
| 5,536,282 A | | 7/1996 | Yoon et al. |
| 5,738,697 A | | 4/1998 | Wu et al. |
| 6,086,648 A | | 7/2000 | Rossetti, Jr. et al. |
| 6,361,403 B1 | | 3/2002 | Kuramochi et al. |
| 6,375,543 B1 | | 4/2002 | Kuramochi et al. |
| 6,450,870 B2 | * | 9/2002 | Ito .............................. 451/542 |
| 6,773,473 B2 | * | 8/2004 | Kinisky et al. ................ 51/296 |

FOREIGN PATENT DOCUMENTS

| | | |
|---|---|---|
| JP | 3161273 | 7/1991 |
| JP | 3281174 | 12/1991 |

OTHER PUBLICATIONS

Christos Boukouvalas, Kostis Magoulas, and Dimitrios Tassios; Application of Supercritical Fluid Extraction in Industrial Waste Treatment: Thermodynamic Modeling and Design; Separation Science and Technology, 33(3), pp. 387-410, 1998.

H. Schmieder, N. Dahmen, J. Schon and G. Wiegand; Industrial and environmental Applications of Supercritical Fluids; Chemistry Under Extreme or Non-Classical conditions, pp. 273-316.

J.F. Baumard, T. Chartier, M. Ferrato, P. Pourtalet; Extraction De Liants Organiques Par Fluides Supercritiques Pour La Realisation De Pieces Ceramiques; pp. 71-76.

* cited by examiner

*Primary Examiner*—Timothy V. Eley
(74) *Attorney, Agent, or Firm*—Sampson & Associates, P.C.

(57) ABSTRACT

An additive impregnated abrasive article and method for fabricating the same is provided. The method includes providing an abrasive article having a pore structure, dissolving an additive in a supercritical fluid, and exposing the abrasive article to the additive-laden supercritical fluid, so that the fluid disperses through the pore structure. The supercritical fluid is then brought to below its critical point for a period of time sufficient to dissociate the additive from the fluid, so that the additive is deposited within the pore structure of the abrasive article.

19 Claims, 2 Drawing Sheets

IMPREGNATION OF GRINDING WHEELS USING SUPERCRITICAL FLUIDS

BACKGROUND OF THE INVENTION (1) Field of the Invention

The present invention relates generally to abrasives and abrasive tools suitable for the grinding and polishing of various materials. This invention more particularly relates to porous, bonded abrasive articles impregnated with grinding aids and methods for making same.

(2) Background Information

The use of porous abrasive products to improve mechanical grinding processes is well known. Many high performance abrasive products require a controlled amount of porosity, and interconnected porosity, to be engineered into the structure of vitrified and resin bonded grinding wheels. Other abrasive products inherently include some amount of porosity. Pores typically provide access to grinding fluids, such as coolants and lubricants, which promote efficient cutting, minimize metallurgical damage (e.g., surface burn), and maximize tool life. Pores also facilitate the clearance of material (e.g., chips or swarf) removed from an object being ground, which is important especially when the object being ground is relatively soft or when surface finish requirements are demanding.

In certain grinding operations as defined by material being ground or mode of grinding, the inclusion of a grinding aid or treatment in a bonded abrasive product can be very beneficial. The aid or treatment can provide a variety of improvements to the grinding process including lubrication, cooling, prevention of loading (attachment of work material chips to the abrasive product) and reaction with the work material rendering it "easier-to-grind" via changes in hardness, ductility and phase. The result can be improved material removal efficiency and/or improved abrasive product life.

Conventional means to add grinding aids or treatments to bonded abrasive products depends on the type of bonding of the products. Products made with resin-type bonds can incorporate many types of grinding aids during the raw batching or mixing process. Subsequent curing of the products is done at relatively low temperature (room temperature through approximately 200° C.) and therefore does not thermally decay or decompose most grinding aids. The grinding aid or treatment remains in the product and can be utilized in a grinding or polishing process.

Various techniques have been and are used to fabricate porous bonded abrasive articles. All vitrified or glass bonded abrasive tools undergo high temperature treatment to form the glass bond and to bind the abrasive particles together. Any grinding aid incorporated into a vitrified product before firing would be thermally decayed or consumed during such a treatment. Therefore, any addition of a grinding aid to a vitrified product can only be feasibly added after the heating process.

Conventional means to add grinding aids or treatments to vitrified or glass bonded abrasive products involves impregnation of molten materials through dipping (Darcy's Law), pressure assist or vacuum assist techniques. These techniques offer disadvantages including variability in completeness and uniformity of impregnation and hazard potential. Handling of molten materials requires added safety procedures and typical grinding aids or treatments, such as waxes and sulfur, are flammable.

U.S. patent application Ser. No. 10/291,976 (the '976 application), entitled Supercritical Fluid (SCF) Extraction Method, filed Nov. 12, 2002, utilizes supercritical fluid processing as a method for extracting pore inducers from highly porous abrasive products. The '976 application is hereby fully incorporated herein by reference.

As market demand has grown for precision components in products such as engines, bearings, and electronic devices (e.g., silicon and silicon carbide wafers, magnetic heads, and display windows) the need has grown for abrasive tools for fine precision grinding of a range of relatively hard and/or brittle materials and soft, heat-sensitive materials. Therefore, there exists a need for further improving porous abrasive articles and tools.

SUMMARY OF THE INVENTION

In accordance with the present invention, a method is provided for fabricating an additive impregnated abrasive article. The method includes providing a fully cured abrasive article having a pore structure, dissolving an additive in a supercritical fluid, and exposing the abrasive article to the additive-laden supercritical fluid, so that the fluid disperses through the pore structure. The supercritical fluid is then brought to below its critical point for a period of time sufficient to dissociate the additive from the fluid, so that the additive is deposited within the pore structure of the abrasive article.

Another aspect of the invention includes the abrasive article fabricated using the foregoing method.

A further aspect of the invention includes a method for fabricating an additive impregnated abrasive article. This method includes providing an abrasive article having a pore structure, placing a supercritical fluid-soluble additive into vessel, suspending the abrasive article in superposed orientation with the additive within the vessel, and supplying fluid under pressure to the vessel. The vessel is sealed and heated, while supplying sufficient heat and pressure to bring the fluid beyond its critical point to form a supercritical fluid, so that the additive is dissolved and dispersed into the pore structure. The method further includes depressurizing and cooling the vessel to bring the supercritical fluid below its critical point, so that the additive is dissociated from the fluid and deposited within the pore structure.

DETAILED DESCRIPTION

The present invention includes a method for impregnating cured porous (natural or induced porosity) abrasive articles with various materials that may be useful in precision grinding, polishing, or cutting applications. One aspect of the present invention was the realization that fluids such as carbon dioxide, when raised to a temperature and pressure beyond their critical point (i.e., supercritical fluids), have desirable solvent and flow (diffusivity) properties that may be useful for infiltrating abrasive tools during their manufacture. Although supercritical fluids (SCFs) had been used in a variety of industrial applications, such as for the decaffeination of coffee, until their use in the above-referenced '976 application, they had not been used to infiltrate solid matrix composites such as grinding wheels for the purpose of generating porosity therein by removing pore inducing material.

Advantageously, when used in the context of the present invention, such supercritical fluids have been found to exhibit liquid-like properties, such as the ability to dissolve other materials, while also exhibiting flow properties (e.g., diffusivity) similar to that of a gas, that enable them to effectively infiltrate the structure of porous grinding tools. Moreover, rather than extracting or dissolving pore inducers as taught by the '976 application, the present invention involves the use of a supercritical fluid to infiltrate and deposit an additive, e.g., a grinding aid, such as wax, or a dye, into the pores of grinding wheels. The additive may be deposited into the pores of otherwise conventional, grinding wheels, either of the type having natural (inherent) porosity, or of the type having induced porosity such as taught by the '976 application.

For example, a grinding aid such as tetracosane (alkane wax) may be dissolved in a supercritical fluid such as supercritical carbon dioxide ($scCO_2$) to form an additive-laden $scCO_2$ solution. The grinding tool (wheel) may then be exposed to the solution under pressure, whereupon the solution infiltrates the pores of the tool. The system is then depressurized, to vaporize the $scCO_2$ from the solution, depositing the grinding aid in-situ in the pores.

The present invention thus provides a convenient, cost effective method for applying desired additives deep and uniformly dispersed within the structure of a grinding tool. Examples of such additives include grinding aids, such as waxes and other lubricants. Other exemplary additives include pigments that may be dispersed throughout the structure to advantageously provide the tool with color that neither fades nor is worn off as the tool wears. Moreover, since a useful medium for this SCF Impregnation is carbon dioxide, the approach disclosed herein is environmentally friendly, particularly when the $CO_2$ is captured for reuse.

Figure 1:
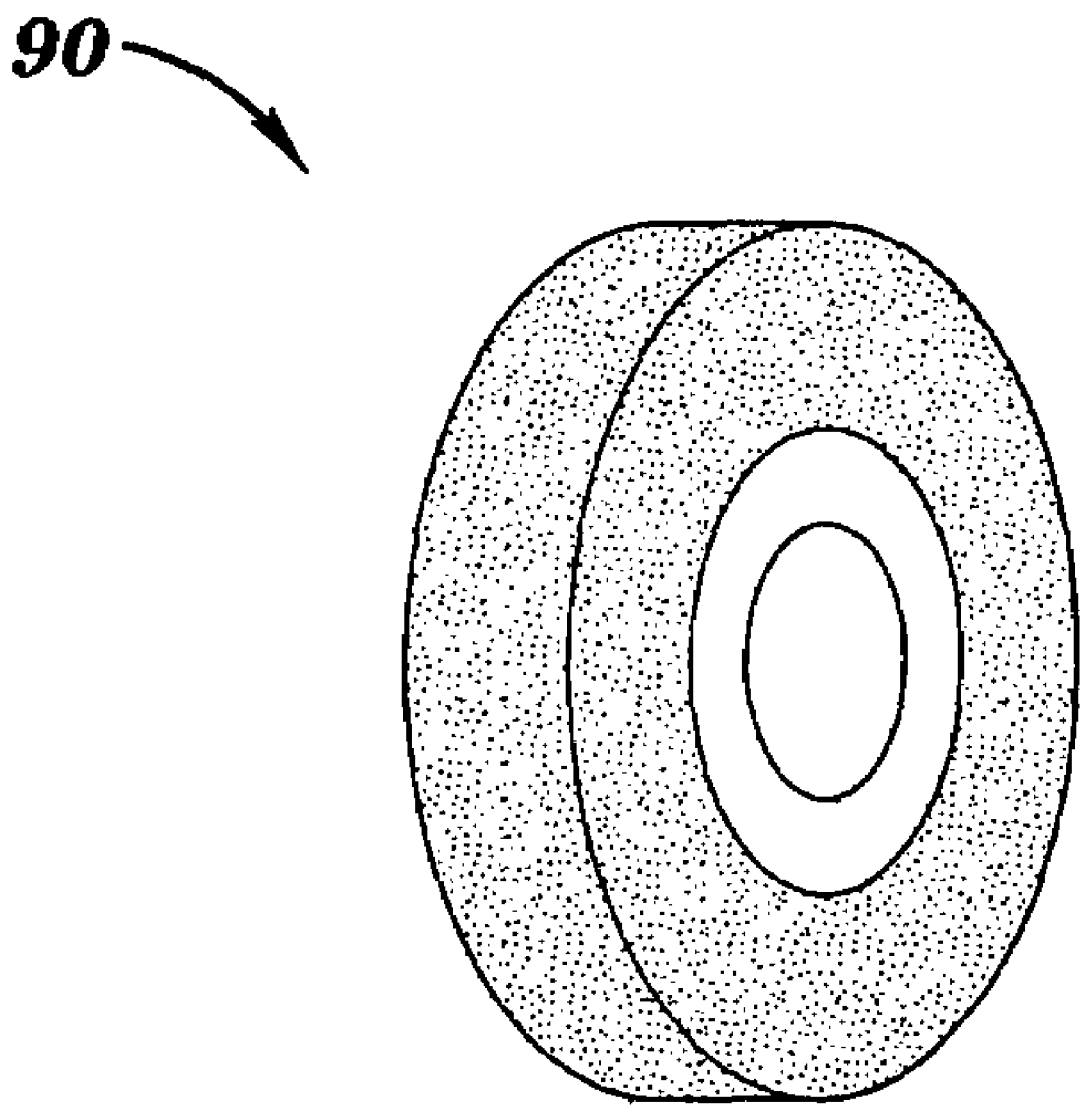
FIG. 1 is a schematic representation an exemplary abrasive tool, in the form a grinding wheel, fabricated using the method of this invention.

One example of an abrasive grinding tool that may be impregnated in accordance with the present invention is bonded abrasive wheel 90 of FIG. 1. As shown, wheel 90 is configured as a conventional ANSI Type 1 wheel. However, the present invention may be used in conjunction with substantially any sized and shaped grinding tool, including wheels of ANSI Types 1, 2, 5-7, 11-13, 16-18, 18R, 19-27, 27A, 28, etc., and conventional segmented wheels. Particular embodiments utilize glass or ceramic (e.g., vitrified) bond material. However, organic (e.g., resinous) or metallic bond material (together with appropriate curing agents if necessary) may also be used without departing from the spirit and scope of the present invention. Other embodiments may include grinding discs, stones and hones used for abrasive polishing and grinding, coated abrasive articles, abrasive grain agglomerates, and combinations thereof.

Embodiments of this invention include SCF impregnated abrasive articles having up to 85 percent or more interconnected porosity. Particular embodiments include vitrified grinding wheels having a conventional porosity structure (i.e., natural porosity) associated with about 46 to 56 volume percent abrasive. Alternatively, vitrified grinding wheels having an induced porosity structure associated with $\leq$about 46 volume percent abrasive, may also be used. Other embodiments may include organic (e.g., phenolic resin) or metal bonded abrasive articles, or vitrified or resin bonded superabrasive grinding wheels of various porosity percentages.

The present invention may be used with abrasive articles having substantially any type of abrasive grain. Examples of suitable abrasives include, but are not limited to alumina in fused, sintered, and/or sol gel forms; silica; silicon carbide; zirconia-alumina; fused or sintered alloys of alumina with at least one ceramic oxide selected from the group consisting of $M_gO$, $C_oO$, $TiO_2$, $V_2O_3$ $Cr_2O_3$, alumina-oxynitrides, ceria, boron suboxide, garnet, emery, tungsten carbide, and combinations thereof; in grit sizes ranging from about 0.5 to about 5000 microns, preferably from about 2 to about 1200 microns. Superabrasive grains, including but not limited to diamond and cubic boron nitride (CBN), with or without a metal coating, having substantially similar grit sizes as the conventional grains, may also be used alone or in combination with other grains. Abrasive grain size and type selection typically vary depending on the nature of the workpiece and the type of grinding process. For fine finish (i.e., 'mirror finish') grinding, superabrasive grains having a smaller particle size, such as ranging from about 0.5 to about 300 microns or even from about 0.5 to about 150 microns may be desirable. In general, smaller (i.e., finer) grain sizes are preferred for fine grinding and surface finishing/polishing operations, while larger (i.e., coarser) grain sizes are preferred for shaping, thinning, and other operations in which a relatively large amount of material removal is required.

Abrasive articles having substantially any type of conventional bond material may be used in embodiments of this invention, provided the binder used in the bond is substantially insoluble to the supercritical fluid being used. As mentioned above, a vitrified bond is used in many desirable embodiments.

An example of a suitable organic bond is a thermosetting resin, but other types of resins may be used. The resin may be either an epoxy resin or a phenolic resin. Specific examples of thermosetting resins include phenolic resins (e.g., novolak and resole), epoxy, unsaturated polyester, bismaleimide, polyimide, cyanate ester, melamines, and the like.

Abrasive articles suitable for use with the embodiments discussed herein may have average pore sizes ranging from about 2 to about 2000 microns. The amount of additive applied to the pores may vary, ranging from amounts capable of applying a thin film or coating to the walls of the pores, to amounts capable of substantially filling the pores.

Substantially any additive that may be readily dissolved in an SCF such as carbon dioxide, may be used. In general, suitable additives are non-polar materials, including non-polar organic materials such as: alkanes with molecular structures greater than n-octadecane (C18H38), e.g., those having up to about 40 Carbon atoms, to include the paraffin wax family; cycloalkanes, e.g., cyclic paraffins and non-polar derivatives that have melting points in excess of about 50 degrees C.; arenes (e.g., aromatic hydrocarbons), including biphenyl (C12H10) and larger molecular structures and non-polar derivatives; butyl carbamate; and mixtures thereof. Other exemplary additives include non-polar sulfur containing compounds, non-polar polyethylenes, fluoropolymers (including polytetrafluoroethylene), paraffin wax and carnauba wax.

In particular embodiments, the additive 102 is selected from the group consisting of: alkanes; C16-C40 alkanes and their non-polar derivatives; C10 or greater cycloalkanes and their non-polar derivatives; C10 or greater alkenes and their non-polar derivatives; C10 or greater arenes and their non-polar derivatives; lipids; hydrocarbons; waxes; fluoropolymer resins and mixtures thereof. Additives that do not necessarily serve as grinding aids, such as dyes used to identify the type or source of origin of the particular tool, may also be impregnated in accordance with the present invention.

In Examples included below, an n-alkane, $C_{24}H_{50}$ (tetracosane) having a melting point of 50 degrees C., was used. The value of tetracosane as an industrial grinding aid has been limited in the past due to its relatively low, narrow melting range; however, it is a good model material for impregnating porous grinding wheels, and is expected to be representative of other organic hydrocarbon additives. Moreover, even given this limitation, tetracosane-impregnated wheels in accordance with this invention have been shown to produce better grinding results than conventional wheels.

Preferred supercritical fluids useful for depositing these additives include $CO_2$, ethane, propane, butane, $H_2O$, and combinations thereof. As discussed above, use of $scCO_2$ may be desirable in light of its relatively low cost, environmental friendliness, and its ability to dissolve many organics. Also, performing impregnation with $scCO_2$ advantageously leaves no solvent to remove at the end of the process, as the $CO_2$ is removed during depressurization. Moreover, although $scCO_2$ is a good solvent for relatively low molecular weight organics and small non-polar compounds, it can also be used to dissolve relatively high molecular weight, high melting point polymers, which are generally insoluble in $scCO_2$ at moderate conditions, by increasing temperature and pressure. For example, the Teflon® AF fluoropolymer is generally insoluble at moderate conditions, but can be dissolved to a 5 weight percent solution in $scCO_2$ at 70 degrees C. and 500 bar.

Having described various aspects of the present invention, the following is a description of the fabrication thereof. Embodiments of the present invention may be fabricated using many aspects of conventional abrasive product manufacture. As mentioned above, abrasive articles having 'natural porosity' may be fabricated using well-known techniques. Alternatively, abrasive articles having induced porosity structures may be fabricated in the manner disclosed in the above-referenced '976 application.

Briefly described, such abrasive articles may be provided by mixing abrasive, and a bond composition. The mixture is then molded (e.g., by compressing at pressures up to about 5000 psi) into a suitable shape. After molding and drying, the abrasive laden composites are fired (typically at temperatures ranging from about 800 to about 1300° C. when using vitrified bond) to yield a composite of a desired (i.e., target) density. The resultant abrasive article preferably has a density of at least 95% of the theoretical specification (target) density, and is generally within a range of from about 98 to 102% of the theoretical specification density. The resultant abrasive article includes a mixture of abrasive and bond matrix, and has a network of nominally randomly distributed pores available for impregnation with grinding aids.

Figure 2:
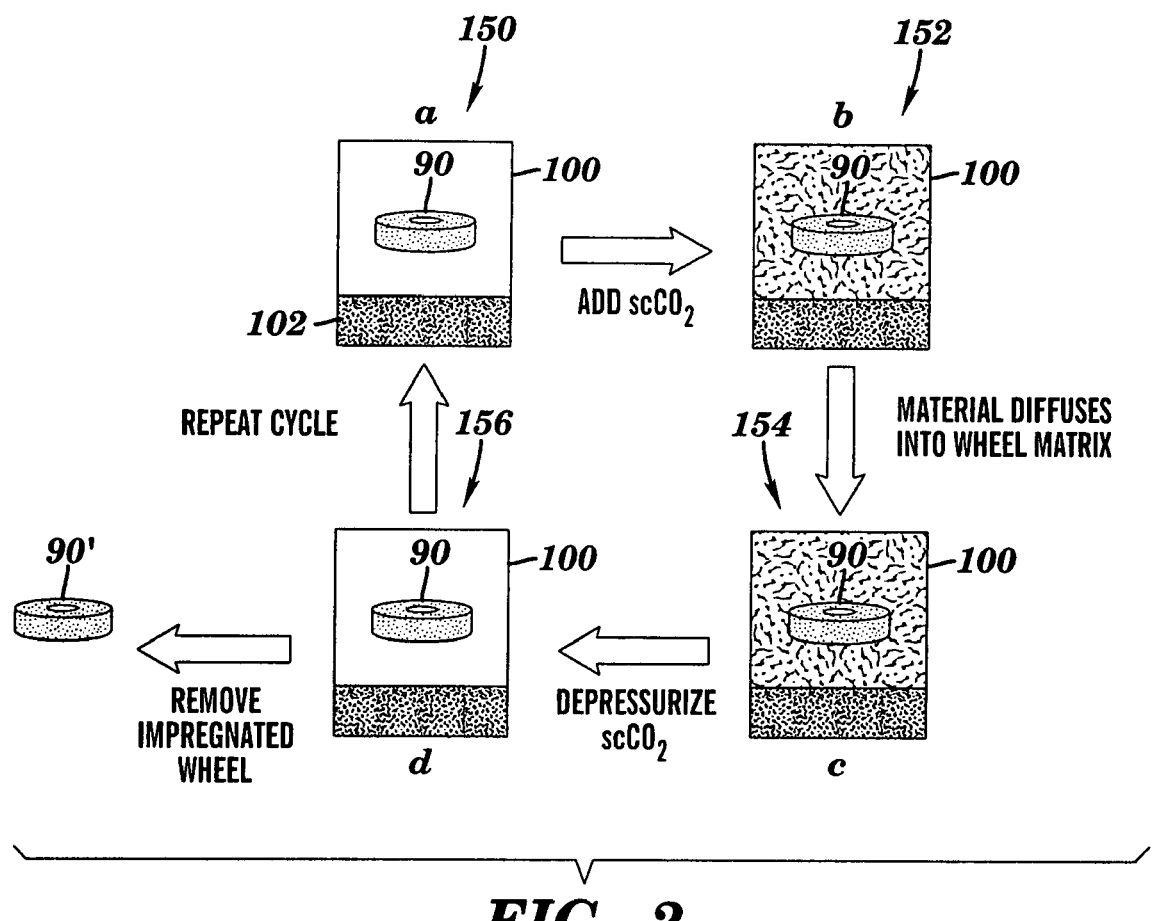
FIG. 2 is a schematic representation of a fabrication process in accordance with the present invention.

Turning now to FIG. 2, once a particular abrasive article is fabricated or otherwise provided, impregnation may be performed by a four-step process. Initially, at step 150, wheel 90 is placed into a suitable vessel 100, and is suspended over the material to be deposited (additive) 102. At step 152, vessel 100 is brought to the desired temperature and pressurized with $CO_2$. The temperature and pressure are chosen so that the $CO_2$ is disposed in a supercritical state sufficient to dissolve additive 102 and attain a uniform concentration of the additive within the $scCO_2$. The particular concentration attained will be a function of the solubility of the additive 102 at the chosen temperature and pressure.

The mixture of $scCO_2$ and additive then diffuses (step 154) into wheel 90. This diffusion occurs relatively quickly, due to the porosity of the wheel, and the relatively high mass transport properties of $scCO_2$. At step 156, vessel 100 is depressurized. This depressurization returns the $CO_2$ to its non-supercritical state (i.e., below its critical point), at which time the dissolved additive 102 drops out of solution in-situ, to effectively deposit the additive in the pores of wheel 90. Steps 150, 152, 154, and 156 may be repeated as necessary to increase the amount of additive deposited within wheel 90.

The abrasive articles and tools of this invention (e.g., grinding wheel 90' shown in FIG. 2) and others discussed herein are desirable for grinding metals and ceramic materials including various oxides, carbides, nitrides and, silicides such as silicon nitride, silicon dioxide, and silicon oxynitride, stabilized zirconia, aluminum oxide (e.g., sapphire), boron carbide, boron nitride, titanium diboride, and aluminum nitride, and composites of these ceramics, as well as, e.g., steel, aluminum, Inconel alloy, titanium, cast iron and other metal alloys and certain metal matrix composites, such as cemented carbides, and polycrystalline diamond and polycrystalline cubic boron nitride. They may be particularly advantageous for mirror finish grinding of hard and/or brittle materials, such as silicon wafers, silicon carbide, alumina titanium carbide, glass, and the like.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

The following examples merely illustrate various embodiments of the articles and methods of this invention. The scope of this invention is not to be considered as limited by the specific embodiments described therein, but rather as defined by the claims that follow. Unless otherwise indicated, all parts and percentages in the examples are by weight.

EXAMPLE 1

Three impregnation experiments were performed substantially as described above with respect to FIG. 2, with tetracosane as additive 102. To perform the experiments, a known amount of tetracosane and a magnetic stir bar were placed in a high pressure vessel 100. A wheel 90 was suspended with copper wire over the additive 102. The vessel was sealed, placed on a stir plate, and heated to the desired temperature in a Thelco™ (Precision Scientific, Winchester, Va., USA) incubator, equipped with a fan for increased heat transfer. Once the oven had been at temperature for one hour, the vessel was pressurized with $scCO_2$. The vessel was maintained at the desired pressure for a 24 hour period, to provide ample time for solubilization of the tetracosane and diffusion into the pores of wheel 90. The vessel was then permitted to cool to room temperature and to depressurize.

A summary of these experiments is shown in Table 1. The amount of tetracosane placed in the vessel was used to determine its concentration in solution (i.e., in $scCO_2$), since the amount was below the maximum solubility value for the tetracosane in $scCO_2$. This concentration, in combination with the known porosity of the wheel, was used to predict the amount of tetracosane that was in solution inside the pore space, i.e., the theoretical mass of impregnated additive. As shown in Table 1, there appears to be substantial agreement between the amount of tetracosane in solution within the pore space, and with the amount actually deposited, as determined by comparing the amount of tetracosane remaining after impregnation, to that initially placed into vessel 100.

TABLE 1

| Exp. ID | Temperature (° C.)/Pressure(bar) | Concentration of in solution $C_{24}H_{50}$ | | Mass Impregnated (mg) | |
|---|---|---|---|---|---|
| | | g/cc × $10^3$ | mole fraction × $10^3$ | Theoretical | Experimental |
| Ex. 1-A | 50/275 | 6.46 | 0.806 | 64.6 | 69 |
| Ex. 1-B | 45/182 | 7.57 | 1.24 | 92.3 | 81 |
| Ex. 1-C | 45/220 | 7.57 | 1.04 | 92.3 | 77 |

EXAMPLE 2

Four conventional vitrified grinding wheels were impregnated with tetracosane. Three of the wheels were provided with amounts of tetracosane (0.092 g, 0.181 g and 0.762 g, respectively), sufficient to essentially coat the pores of the wheel with a thin layer of tetracosane. The fourth wheel was provided with enough tetracosane (8.87 g) to nominally completely fill its pores. The three coated wheels (0.092, 0.181 & 0.762) were impregnated substantially as described in Example 1 above, i.e., by exposure to $scCO_2$ having predetermined amounts of tetracosane dissolved therein, at 4,000 psia and 50° C. for 24 hrs. The 8.87 g wheel was impregnated by the conventional technique of immersion into a molten bath of tetracosane. Two control wheels were also provided, one without any additive in its pores ('Standard'), and another ('Wax 12') having pores that had been filled with wax using the conventional immersion approach. All six wheels were tested by Wet ID Grinding of 52100 bearing steel, under the conditions shown in Table 2.

TABLE 2

| Material: | 52100 Steel |
|---|---|
| Hardness: | 58Rc |
| Part Width [mm]: | 6.4262 |
| Machine: | Heald (Cincinnati Milacron, Cincinnati, Ohio) Controlled Force Grinder |
| Coolant: | E210 (Master Chemical Corporation, Perrysburg Ohio) @ 5% |
| Wheel Speed [rpm]: | 21000 |
| Wheel Speed [m/s]: | 55.84 |
| Power [W/div]: | 80 |
| Approx. Wheel Diam. [mm]: | 49.78 |
| Approx. Work Diam. [mm]: | 63.50 |
| Work Speed [rpm]: | 345 |
| | Electric Feed |
| Total Infeed [mm]: | 0.356 |
| Sparkout [s]: | 5.2 |

Testing

All of the wheels were tested by grinding inner cylindrical surfaces of workpieces fabricated from hardened 52100 steel, to create bores having inner diameters of 2.5 inches (6.4 cm). After dressing the wheels, five grinds, each removing approximately 0.3 mm from the part diameter, were made at a removal rate (Q') of about 4 $mm^3/s$, mm. Power was recorded for each grind. Wheel and part measurements (e.g., metal removal, wheel wear, and power consumption) were made after the final grind.

Test Results

Results of this testing are shown in Table 3 below. As shown, the three supercritical fluid impregnated (SCFI) wheels with partially filled pores (0.762 g, 0.092 g, and 0.181 g wheels) experienced less wear as a function of cumulative metal removed than the Standard wheels, while exhibiting similar or only slightly increased power consumption (Watts/mm). These partially filled SCFI wheels also exhibited cumulative G ratios (cumulative ratio of volume of material ground to volume of wheel consumed) that were superior to those of the control (Standard and Standard with Wax) wheels.

TABLE 3

| Specification | Ave Peak Power (watts/mm) | Cumulative Wheel Wear Rate ($mm^3/s$, mm) | Cumulative Grinding Ratio |
|---|---|---|---|
| Untreated standard | 154 | 0.031 | 123 |
| Standard with paraffin wax treatment* | 147 (−5%) | 0.027 (−13%) | 145 (+18%) |
| 0.092 g SCF tetracosane | 158 (+3%) | 0.018 (−42%) | 217 (+76%) |
| 0.181 g SCF tetracosane | 163 (+6%) | 0.027 (−13%) | 175 (+42%) |
| 0.762 g SCF tetracosane | 154 (same) | 0.018 (−42%) | 217 (+76%) |
| 8.87 g tetracosane* | 142 (−8%) | 0.036 (+16%) | 108 (−12%) |

*conventional technique of dipping wheel into molten bath of tetracosane

Summary

Supercritical Fluid Impregnation has been shown to be an effective method of applying a material such as a grinding aid to the pore structure of porous grinding tools. An SCFI wheel having pores that were substantially filled with a grinding aid (tetracosane) performed comparably to conventional commercial products (Standard, Wax 12). However, SCFI wheels having only partially filled pores surprisingly resulted in better grinding efficiency (G-ratio) performance than the conventional commercial products.

EXAMPLE 3

An additional experiment was conducted substantially as described above with respect to FIG. 2, using a dye as additive 102. This experiment demonstrated that the present invention may be used to solve problems associated with conventional wheel-dying methods, such as inadequate dye penetration, uneven dispersion through the wheel, and the need to use potentially hazardous solvents.

An anthraquinone dye, commonly known as Disperse Blue 77 ($C_{20}H_{12}N_2O_6$), was selected, which had a melting point of 226 degrees C., molecular weight of 377 g/mol, and a solubility in scCO$_2$ of 1.29E-4 at 300 atm and 50 degrees C. A wheel 90 was suspended in vessel 100 above 100 mg of Blue 77 and a stir bar. The vessel was closed and heated to 50 degrees C. CO$_2$ was pumped into the vessel to a pressure of 300 bar, sealed, and left for 24 hours. The vessel was then permitted to cool and depressurize. The resulting impregnated wheel 90' was dyed, and a cross-section revealed substantially no color variation with respect to impregnation depth.

What is claimed is:

1. A method for fabricating a heterogeneous additive impregnated abrasive article, said method comprising:
   a) providing a heterogeneous abrasive article having a pore structure;
   b) dissolving an additive in a supercritical fluid, wherein the additive is selected from the group consisting of: alkanes, C16-C40 alkanes and their non-polar derivatives, C10 or greater cycloalkanes and their non-polar derivatives, C10 or greater alkenes and their non-polar derivatives, C10 or greater arenes and their non-polar derivatives, alkanes with molecular structures greater than n-octadecane (C18H38), cycloalkanes, cyclic paraffins, non-polar derivatives of cycloalkanes that have melting points in excess of about 50 degrees Celsius, arenes, aromatic hydrocarbons, biphenyl (C12H10), non-polar derivatives of arenes, butyl carbamate, non-polar sulfur containing compounds, non-polar polyethylenes, fluoropolymers, polytetrafluoroethylene, tetracosane (C$_{24}$H$_{50}$), lipids, hydrocarbons, waxes, fluoropolymer resins, dyes, paraffin wax, carnauba wax, and mixtures thereof;
   c) exposing the abrasive article to the additive-containing supercritical fluid in a reaction vessel at a pressure in excess of atmospheric pressure, whereby the additive is carried into the pore structure; and
   d) depressurizing the reaction vessel to dispose the supercritical fluid below its critical point for a period of time sufficient to dissociate the additive from the fluid, whereby the additive is deposited within the pore structure.

2. The method of claim 1, wherein the abrasive article is substantially insoluble in the supercritical fluid.

3. The method of claim 2, wherein the abrasive article comprises abrasive grain and bond material.

4. The method of claim 3, wherein the bond is selected from the group consisting of inorganic, organic, and metallic bonds.

5. The method of claim 4, wherein the bond comprises vitrified bond material.

6. The method of claim 4, wherein the abrasive article comprises resinous bond material.

7. The method of claim 6 wherein the resinous bond material comprises a resin selected from the group consisting of phenolic resins, epoxy resins, unsaturated polyester resins, bismaleimide resins, polyimide resins, cyanate resins, melamine polymers, and mixtures thereof.

8. The method of claim 3 wherein said abrasive grain comprises an abrasive grain selected from the group consisting of diamond, cubic boron nitride, fused alumina, sintered alumina, sintered sol gel alumina, alumina-zirconia, alumina-oxynitrides, silicon carbide, fused or sintered alloys of alumina with at least one ceramic oxide selected from the group consisting of M$_g$O, C$_o$O, TiO$_2$, V$_2$O$_3$ Cr$_2$O$_3$, tungsten carbide and combinations thereof.

9. The method of claim 3 wherein said abrasive grain comprises an average particle size ranging from:
   greater than or equal to about 0.5 microns; and
   less than or equal to about 5000 microns.

10. The method of claim 3, wherein the abrasive article comprises superabrasive grain.

11. The method of claim 1, wherein said dissolving b) and said exposing c) further comprise heating the vessel.

12. The method of claim 1, wherein said abrasive article is cured prior to said exposing c) of said article to said additive-containing supercritical fluid.

13. The method of claim 12, wherein said disposing d) further comprises lowering the temperature of the vessel.

14. The method of claim 1 wherein said additive comprises a non-polar organic material.

15. The method of claim 1 wherein said additive is selected from the group consisting of: alkanes; C16-C40 alkanes and their non-polar derivatives; C10 or greater cycloalkanes and their non-polar derivatives, C10 or greater alkenes and their non-polar derivatives, C10 or greater arenes and their non-polar derivatives, lipids, hydrocarbons, waxes, fluoropolymer resins, and mixtures thereof.

16. The method of claim 15 wherein said additive comprises tetracosane.

17. The method of claim 15 wherein said additive comprises wax.

18. The method of claim 1 wherein the supercritical fluid is selected from the group consisting of CO$_2$, ethane, propane, butane, H$_2$O, and combinations thereof.

19. The method of claim 1 wherein said supercritical fluid comprises carbon dioxide.

* * * * *